United States Patent [19]  [11]  4,150,946
Neel et al.  [45]  Apr. 24, 1979

[54] WATER-SOLUBLE POLYURETHANES AND COMPOSITIONS AND APPLICATION THEREOF TO SUBSTRATES

[75] Inventors: Jean Neel; Robert Violland, both of Lyon, France

[73] Assignee: Rhone-Poulenc Industries, Paris, France

[21] Appl. No.: 849,602

[22] Filed: Nov. 8, 1977

Related U.S. Application Data

[63] Continuation-in-part of Ser. No. 770,657, Feb. 22, 1977, abandoned, which is a continuation of Ser. No. 628,657, Nov. 4, 1975, abandoned, which is a continuation-in-part of Ser. No. 514,151, Oct. 11, 1974, Pat. No. 4,110,284.

[51] Int. Cl.$^2$ ............... D06M 15/12; C08G 18/46; C08J 3/02; B32B 27/40
[52] U.S. Cl. .................. 8/115.6; 260/29.2 TN; 260/859 R; 528/71; 528/273; 528/904; 528/905; 8/115.7; 8/192; 428/425
[58] Field of Search .............. 260/75 NK, 29.2 TN, 260/75 T; 8/115.6; 528/71

[56] References Cited

U.S. PATENT DOCUMENTS

| T862,017 | 5/1969 | Caldwell | 260/49 |
|---|---|---|---|
| 3,018,272 | 1/1962 | Griffing et al. | 260/75 S |
| 3,189,578 | 6/1975 | Kuemmerer | 260/29.2 TN |
| 3,920,598 | 11/1975 | Reiff et al. | 260/75 NK |
| 3,998,871 | 12/1976 | Carlson | 260/75 NK |
| 4,110,284 | 8/1978 | Violland et al. | 260/29.2 TN |

FOREIGN PATENT DOCUMENTS

1128568  9/1968  United Kingdom ............ 260/29.2 TN

*Primary Examiner*—H. S. Cockeram
*Attorney, Agent, or Firm*—Bacon & Thomas

[57] ABSTRACT

Water-soluble polyurethanes are obtained by reacting sulfonated anionic polyesters containing about 0.8 to 2% sulfur with at least one diisocyanate to form film-forming polyurethanes which are directly soluble in water. The polyurethanes of the invention are advantageously applied in aqueous solution form as sizing for textiles and for bonding leathers.

55 Claims, No Drawings

WATER-SOLUBLE POLYURETHANES AND COMPOSITIONS AND APPLICATION THEREOF TO SUBSTRATES

CROSS-REFERENCE TO RELATED APPLICATIONS

The present application is a continuation-in-part application of copending application Ser. No. 770,657 filed on Feb. 22, 1977, which in turn is a continuation application of application Ser. No. 628,657 filed on Nov. 4, 1975, both now abandoned, which in turn is a continuation-in-part application of application Ser. No. 514,151, filed Oct. 11, 1974, now U.S. Pat. No. 4,110,284, the entire disclosure of which is expressly incorporated herein by reference.

BACKGROUND OF THE INVENTION

The present invention relates to water-soluble film-forming polyurethanes, aqueous solutions thereof and processes for preparing same.

The invention further relates to the application of the products, in the form of solutions, as sizing for textiles, preferably for sizing warp threads for weaving and the application of these aqueous polyurethane solutions for bonding the flesh and grain splits of leathers.

In the textile industry there is a current trend to weave "synthetic" yarns which only have the twist thereof imparted by the frame on which the continuous filament is spun, that is to say 10 to 15 turns per meter. However, it is then necessary, to facilitate the weaving operation, to apply special high performance sizes to the yarns because it is virtually impossible to weave these low-tension yarns due to their lack of sufficient cohesion. Of course, it is also necessary that these sizes be removable by means of water before dyeing can be accomplished.

Various products have heretofore been proposed for sizing synthetic yarns, for example products based on acrylic or vinyl polymers, but these products are generally unsuitable, and specifically undesirable for application to linear polyesters, such as polyethylene terephthalates, and the performances of these products remain unsatisfactory. Other products which have been proposed are various types of water-soluble sulfonated aliphatic or aromatic polyesters. By way of example, there may be mentioned polyesters obtained from isophthalic acid, sodium dimethylsulfoisophthalate and diethylene glycol, or from isophthalic acid, sodium dimethylsulfoisophthalate, adipic acid and diethylene glycol, or from isophthalic acid, unsaturated acids (maleic acid and itaconic acid), diethylene glycol and sodium metabisulfite and the like.

The commercially available products of this type are likewise not always entirely satisfactory. In general, there are two different types of difficulties encountered in the utilization of these; namely problems in the application of same or in their preparation. Thus, the shelf life of the aqueous solutions is relatively short and the mechanical properties of the polymers are seriously inadequate if their numerical average molecular weight does not reach relatively high values. However, in seeking to obtain polymers having the necessary high numerical average molecular weights, serious technological difficulties are encountered, such as the necessity of carrying out the condensation reactions in a high vacuum and for considerable periods of time which obviously detract from the processability of these polymers and augment the expense of products derived therefrom. Another disadvantage, encountered especially with the acrylics, is the fact that these products cause a certain amount of soiling of the weaving looms.

The British Patent No. 1,128,568 discloses water-dispersible polyurethanes which are prepared from a polyester or polyamide having a molecular weight of between 600 and 20,000 and containing carboxylate and/or sulphonate groups, and polyisocyanates. These polyurethanes are insoluble in water and therefore are not useful as sizing agents.

SUMMARY OF THE INVENTION

It is, therefore, a primary object of the present invention to provide new film-forming water-soluble polymers and aqueous solutions thereof which do not suffer from the disadvantages and problems encountered with prior art water-soluble polymers and aqueous polymer solutions.

Another object of the present invention is to provide a film-forming anionic polyurethane having a relatively high numerical molecular weight which is directly soluble in water.

It is still a further object of the present invention to provide such polyurethanes which are capable of forming a protective film coating on textiles, which is readily removable by means of water.

A still further object of the present invention is to provide aqueous solutions of the aforementioned polyurethanes having a polymer content as high as 40% by weight.

It is a further object of the present invention to provide a solution for sizing textiles and yarns. It is a special object of the present invention to provide such a sizing solution which particularly is useful for sizing polyesters.

A further object of the present invention is to provide a process for sizing textile yarns and bonding leathers.

It is still a further object of the present invention to provide such a sizing process by which a size is applied to the material, which can be readily removed by water.

These and other objects are accomplished by the processes and products of the present invention comprising film-forming water-soluble polyurethanes obtained by the reaction of a sulfonated anionic polyester with at least one diisocyanate and wherein the molar ratio of NCO/OH and COOH is less than about 1 and aqueous solutions of the aforementioned polyurethane and the application of same to flexible substrates.

In particular, according to the present invention, there is provided a film-forming, directly water-soluble, anionic polyester polyurethane comprising recurring units of the formula —A—B—, wherein A is a sulfonated anionic polyester unit having a sulfur content of between about 0.8 and 2% by weight, an acid number of less than about 200 mg KOH/g, and a molecular weight of between about 500 and 3000, and B is a diurethane unit.

The sulfonated anionic polyester is the co-condensation product of an organic diacid such as e.g., a saturated or unsaturated aliphatic diacid, an aromatic diacid, a polynuclear aromatic diacid, or an araliphatic diacid, an organic sulfonated diacid and a diol, or the ester-forming derivatives thereof.

The average molecular weight of the water-soluble polyester polyurethane can vary from about 10,000 to about 100,000.

Thus, the polyester polyurethanes according to the present invention may comprise a number of polyester chains, comprising at least one unit of the formula (I) and one unit of the formula (II).

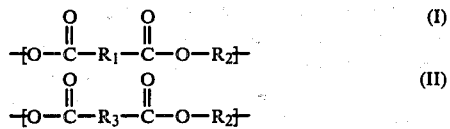

which are linked together by a unit of the formula:

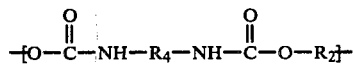

in which formulas:

R₁ represents a divalent saturated hydrocarbon group such as an ethylene, tetramethylene, hexamethylene or octamethylene, a divalent unsaturated aliphatic hydrocarbon group, such as vinylene, or 2,3-propenylene, or a divalent monocyclic aromatic group such as o-phenylene, m-phenylene or p-phenylene, R₂ represents a divalent saturated aliphatic group, such as an ethylene, tetramethylene, hexamethylene, 2,2-dimethyl propylene, 3-oxo-pentanylene, or 4-oxo-heptanylene, or a divalent saturated cyclic hydrocarbon group such as 1,3-cyclohexylene or 4,4'-diyl 2,2-dicyclohexyl propane, R₃ is a radical which may be one of the following radicals:

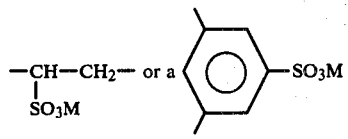

group wherein M is an alkali metal ion, and

R₄ is a divalent group selected from the group consisting of hexamethylene, tetramethylene

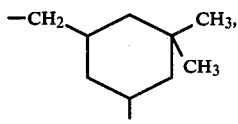

m-phenylene, p-phenylene, 2,4-tolyene, 2,6-tolyene, 4,4'-diyl-dicyclohexylmethane, 4,4'-diphenylmethane, 1,5-diyl-naphthalene.

Preferably the polyester polyurethanes according to the present invention are a polycondensation product from the reaction of at least one diisocyanate and a sulfonated anionic polyester wherein the molar ratio of isocyanate groups to total hydroxyl and carboxyl groups in the reactants is less than about 1.

According to the present invention there is further provided a method for the preparation of the above-defined polyester polyurethane comprising reacting at least one diisocyanate with a sulfonated anionic polyester having a sulfur content of between about 0.8 and 2% by weight, an acid number of less than about 20 mg KOH/g, and a molecular weight of between about 500 and 3000, the molar ratio of isocyanate groups to total hydroxyl and carboxyl groups in said reactions being less than about 1.

The film-forming but water-soluble polyester-polyurethanes according to the present invention are especially useful as sizing agents for sizing textile materials, in particular for sizing textile yarns before weaving in order to impart thereto a sufficient abrasion resistance to provide for excellent weaving conditions. Due to their good solubility in water, the polyester polyurethanes can readily be formulated into aqueous sizing solutions. The applied size can be equally easily removed again from the textile material by means of water at any time, e.g., before dying the material.

The polyester-polyurethanes according to the invention are especially useful for sizing polyester fibers, which are among the most difficult textile fibers to size.

The polyester-polyurethanes of the invention can obviously be applied also to fibers other than polyesters, e.g., acrylic fibers; woolen fibers; fiberglass; polyimide fibers; polyamide fibers; chlorofiber; and polyethylene and polypropylene fibers.

According to the present invention there are also provided liquid compositions for treating textile materials comprising water and dissolved therein a polyester-polyurethane as defined above in an amount sufficient to impart abrasion resistance to the treated textile material, e.g., to impart sufficient abrasion resistance to a textile yarn to provide for excellent weaving properties. Preferably a sizing solution contains between 1 to 40% of the polyester polyurethane.

According to the present invention there is further provided a process for sizing textile materials, in particular textile yarns, which comprises applying thereto the above-described liquid composition in an amount sufficient to impart abrasion resistance to the material.

Preferably the dry sized textile material contains from about 1 to about 37 by weight of the sizing.

Other objects, features and advantages of the present invention will become apparent to those skilled in the art from the detailed description which follows.

DETAILED DESCRIPTION OF THE INVENTION

The water-soluble polyurethane of the invention is generally obtained by condensing, in a first stage, a diacid or one of its diesters with a diol in the presence of a diacid having a sulfonic acid group or its ester as the anionic component, the relative proportions of the anionic component and of the non-anionic diacid being such that a sulfur content of between 0.8 and 2% by weight is introduced, in the presence of a conventional polyesterification catalyst. According to a preferred embodiment, the condensation reaction is carried out so that the resultant polyester has an acid number at least less than 20 mg of KOH/g and preferably less than 5 mg of KOH/g, and a sulfur content of between 0.8 and 2% by weight, preferably between 1.2 and 1.8% and a molecular weight between about 500 and 3000.

The above polyester is reacted with at least one diisocyanate in a conventional manner to form the polyurethane wherein the value of the molar ratio —NCO-/OH+COOH is chosen in accordance with the desired value of the final molecular weight of the polyurethane. The molar ratio of the foregoing in the preferred polyurethanes of the present invention is generally less than 1 and is determined by the weight percentage of diisocyanate introduced.

The reaction of the diisocyanates with the polyesters may be carried out in either a solid medium or a molten medium with the latter being preferred.

The polyurethane according to the invention, whether in the form of a powder, granules or flakes, dissolves spontaneously even in cold water at virtually all concentrations, forming limpid solutions.

Aqueous solutions of the film-forming polyurethanes of the present invention with polymer concentrations ranging between about 1% and 40% by weight may be directly utilized for sizing warp yarns for weaving and bonding the fresh split and grain split of leathers.

The following may be mentioned for purposes of illustration only as suitable starting materials for carrying out the process of the invention:

As diacids, saturated or unsaturated aliphatic diacids and aromatic diacids, such as succinic, adipic, suberic and sebacic acid, maleic, fumaric and itaconic acid and orthophthalic, isophthalic and terephthalic acids, polynuclear diacids, araliphatic diacids, the anhydrides of these acids and their diesters such as the methyl, ethyl, propyl and butyl diesters and the like may be used.

Suitable diols include aliphatic glycols such as ethylene glycol, diethylene glycol and the higher homologues, dipropylene glycol and the higher homologues, 1,4-butanediol, 1,6-mexanediol, neopentyl glycol and cycloaliphatic glycols such as cyclohexanediol and dicyclohexanediol-propane.

As the component containing an anionic group, the sodium diacid-sulfonates or their esters, such as the dialkylsulfoisophthalates and dialkylsulfosuccinates, such as sodium dimethylisophthalate-5-sulfonate or sodium dimethylsulfosuccinate may be mentioned.

Diisocyanates include the aliphatic, cycloaliphatic, unsaturated cycloaliphatic, aryl or alkylaryl diisocyanates, such as hexamethylene-diisocyanate, tetramethylhexamethylene-diisocyanate, isophorene-diisocyanate, m- and p-phenylene-diisocyanate, toluene-2,4- and 2,6-diisocyanate, dicyclohexylmethane-diisocyanate, 4,4'-diphenylmethane-diisocyanate and naphthalene-diisocyanate.

Selection of the various components to be reacted is made on the basis of the chemical nature of the surface which is to be treated with the polymer and also the desired properties of the polymer itself as will be appreciated by those skilled in the art.

Examples of carrying out the invention are given below by way of illustration and without implying any limitation as to the scope of the present invention. In the examples, the parts, percentages and ratios are to be understood as being by weight, unless stated otherwise.

EXAMPLE 1

A. Preparation of the anionic polyester

A polyester is first prepared from adipic acid, sodium dimethylisophthalate-5-sulfonate and diethylene glycol by condensing these reactants in the molar ratio of 0.854/0.146/1.13 respectively.

More specifically, 1,247 parts of adipic acid, 432 parts of sodium dimethylisophthalate-5-sulfonate, 1,200 parts of diethylene glycol and 0.4 g of catalyst, namely tetraisopropyl ortho-titanate, are introduced into a reaction vessel equipped with a stirrer, a thermometer and a distillation device.

The co-condensation is carried out in the same manner as conventional polyesterifications. The final conditions are a temperature of 220° C. and a pressure of 400 mm of mercury.

A polyester which exhibits the following characteristics is obtained:

| | |
|---|---|
| acid number ($I_a$) | 0.8 mg KOH/g |
| hydroxyl number ($I_{OH}$) | 60.5 mg KOH/g |
| sulfur content | 1.88% |
| numerical average molecular weight: | 1,835. |

B. Preparation of the polyurethane

In order to prepare the water-soluble polyurethane in accordance with the invention, the subsequent procedure is as follows:

92 parts of toluene-diisocyanate are added gradually, over a period of 2 hours, to 1,000 parts of the polyester prepared according to the process detailed under A above, which has been heated to a temperature of 200° C. The amount of diisocyanate corresponds to a proportion of 9.2% by weight. The temperature is kept at 200° C.

The mixture becomes very viscous. The reaction is allowed to continue for ½ hour following the addition of the toluene-diisocyanate. After cooling to ambient temperature, the product is in the form of a very elastic solid. It dissolves very easily in cold water, giving a limpid solution of low viscosity for polymer concentrations of up to 40%.

The polymer obtained in this stage B has the following characteristics:

| | |
|---|---|
| numerical average molecular weight (Mn): | 85,000 |
| toluene-diisocyanate introduced into the reaction: | 9.2% |
| glass transition temperature (Tg): | −30° C. |

The foregoing properties of the polyurethane are summarized in Table I below along with the properties for the products obtained in the examples which follow.

EXAMPLE 2

The following are prepared under the conditions set forth in Example 1:

A. an anionic polyester from:

| | mols. | parts |
|---|---|---|
| isophthalic acid | 0.46 | 671.6 |
| sodium dimethylisophthalate-5-sulfonate | 0.14 | 414.4 |
| adipic acid | 0.4 | 584 |
| diethylene glycol | 1.12 | 1,187.2 |

The polyester has an acid number ($I_a$) of 2 and OH number ($I_{OH}$) of 44.6.

B. a polyurethane from:

| | |
|---|---|
| anionic polyester from A | 1,000 parts |
| toluene-diisocyanate | 71.5 parts |

A polyurethane having a Mn of 12,200 and a Tg of −5° C. is obtained.

EXAMPLES 3 to 5

Following the process described in Example 1, polyurethanes are prepared with varying relative proportions of isophthalic acid and adipic acid in the polyester and varying proportions of toluene-diisocyanate employed for the reaction in which the polyurethane is formed.

For comparison purposes, the values of the properties of the resultant polymers are set forth in Table I.

EXAMPLE 6

This example describes the preparation of a polyurethane with sodium dimethylsulfosuccinate as the anionic component.

A. Preparation of the anionic polyester

A polyester with a molar ratio of 0.854/0.146/1.13 for the acid, sulfonate and glycol, respectively, is prepared as follows:

1,411 parts of isophthalic acid, 372 parts of sodium dimethylsulfosuccinate, 1,219 parts of diethylene glycol and 0.4 part of catalyst are introduced into a vessel, as indicated in Example 1. The co-condensation is carried out in the usual way with the temperature at completion being 190° C. and the pressure being 15 mm of mercury. The polyester has an acid number of 16 and a hydroxyl number of 54.6.

B. Preparation of the soluble polyurethane 110 parts of toluene-diisocyanate are added to 1,000 parts of the polyester prepared above under A, heated in a vessel to a temperature of 190° C., and thereafter the procedure described in Example 1 B is followed.

The polyurethane polymer obtained has a glass transition point of 45° C. and a Mn of 11,400.

| hydroxyl number ($I_{OH}$) | 29.9 mg KOH/g |
|---|---|

B. A polyurethane from:

| | |
|---|---|
| the anionic polyester from A | 1,000 parts |
| toluene-diisocyanate | |
| (mixture of 2,4- and 2,6 | |
| isomers in a ratio of 80/20) | 39.6 parts |

The polyurethane polymer which is obtained in this step B dissolves very easily in water, even in cold water. It has the following characteristics:
glass transition temperature (Tg): 17° C.
numerical average molecular weight (Mn): 19650

EXAMPLE 8

A water-soluble polyurethane polymer is prepared by reacting 1,000 parts of the polyester described in Example 7 (A), with 38.8 parts of diphenylmethane-diisocyanate. It has the following characteristics:
glass transition temperature (Tg)=14° C.
numerical average molecular weight (Mn)=17,800

Applications of the instant polyurethanes to yarn substrates are illustrated below.

EXAMPLE 9

A 5% solution of the polyurethane of Example 4 is prepared.

A polyester yarn is sized with this solution, using an industrial drum-type sizer. The yarn is a texturized 76

TABLE I

| Example No. | Anionic polyester | | | | | | | Polyurethane | | |
|---|---|---|---|---|---|---|---|---|---|---|
| | Molar starting composition | | | | | Numbers | | T D I | Properties | |
| | I A | DMSIP | DMSS | A A | DEG | $I_a$ | $I_{OH}$ | % | Tg° C. | Mn |
| 1 | — | 0.146 | — | 0.854 | 1.13 | 0.8 | 60.5 | 9.2 | −30 | 85,000 |
| 2 | 0.46 | 0.14 | — | 0.4 | 1.12 | 2 | 44.6 | 7.15 | − 5 | 12,200 |
| 3 | 0.66 | 0.14 | — | 0.2 | 1.05 | 2.26 | 18 | 3.8 | +10 | 18,600 |
| 4 | 0.66 | 0.14 | — | 0.2 | 1.12 | 3 | 31 | 5.5 | +16 | 17,300 |
| 5 | 0.74 | 0.14 | — | 0.12 | 1.16 | 3.5 | 44.1 | 7.1 | +24 | 19,000 |
| 6 | 0.85 | — | 0.15 | — | 1.15 | 16 | 54.6 | 11 | +45 | 11,400 |

Abbreviations:
I A : isophthalic acid
DMSIP : sodium dimethylsulfoisophthalate
DMSS : sodium dimethylsulfosuccinate
A A : adipic acid
DEG : diethylene glycol
Mn : numerical average molecular weight

EXAMPLE 7

The following are prepared under practically the same reaction conditions to those of Example 1:

A. an anionic polyester from:

| | mols. | parts |
|---|---|---|
| dimethylterephthalate | 0.5 | 970 |
| sodium dimethylisophthalate-5-sulfonate | 0.15 | 444 |
| adipic acid | 0.4 | 584 |
| ethylene glycol | 1.15 | 713 |

The final conditions of the co-condensation are a temperature of 220° C. and a pressure of 20 mm of mercury.

A polyester which exhibits the following characteristics is obtained:

| | |
|---|---|
| acid number ($I_a$) | 0.5 mg KOH/g | decitex/22 strand yarn, with a twist of 180 turns. After sizing, carried out without using any fatty adjuvant, a polyurethane deposit corresponding to 3% of the weight of the yarn was obtained.

The sized yarn is used for weaving a 1.60 m wide taffeta construction, with 35 picks per centimeter, on a conventional loom at 210 picks/minute.

The yarn webs behind the meshes are uncrossed very easily. After having produced a 1,500 meter length of fabric, no soiling whatsoever of the reed and no deposit of size on any component of the weaving loom are found.

The polymers can be removed, without difficulty, by conventional processes prior to dyeing the fabrics.

EXAMPLE 10

A 6% solution of the polyurethane of Example 5 is prepared.

A polyester warp yarn is sized with this solution. This yarn is a twist-free 72 decitex/22 strand semi-matt yarn. The amount of size is 3%.

The sized yarn is used for weaving as in Example 9, except that the weft is a polyester-viscose yarn of metric number 70.

The observations as those indicated in Example 9 are made.

EXAMPLE 11

An aqueous solution containing 4% by weight of the polyurethane of Example 5 is prepared.

A string of polyester yarns wherein the threads comprise 72 decitex/22 strands which are twisted 280 times is sized with the above solution. The sizing is carried out on a 7-drum machine which is heated to 115° C. The sizing speed is 40 m/min.

The sized yarn is used for weaving on a shuttle-loom at 210 strokes/min. into a tissue having a width of 1.60 m and a taffeta-weave woven at 30 woof-strokes per centimeter.

It is noted that the sheets of yarn readily uncross behind the grids. After a 3,000-meter length of fabric is produced, no soiling of the card, the grids, the shuttle or the chain support is visible.

The polyurethanes can be eliminated easily by conventional methods before the fabrics are dyed.

EXAMPLE 12

An aqueous solution containing 4% by weight of the polyurethane of Example 5 is prepared.

A string of textured polyester yarns wherein the threads comprise 50 decitex/22 strands, which are twisted 200 times, is sized with the above solution.

The sizing is done in the same manner as is described in Example 11.

The weaving performance is excellent with a loom-yield of 96%. The amount of sizing is 3.8%.

EXAMPLE 13

An aqueous solution containing 3.8% by weight of the polyurethane of Example 5 is prepared.

A chain of textured polyester yarn wherein the threads comprise 50 decitex/22 strands, which are twisted 200 times, are sized with the above solution.

The sizing is effected as is previously described in Example 11.

The sized yarn is woven on a spike-loom at 240 strokes/min. into a tissue having a width of 1.60 m and a serge weave.

Weaving results are excellent.

EXAMPLE 14

An aqueous solution containing 3.4% by weight of the polyurethane of Example 5 is prepared.

A chain of textured polyester yarn wherein the threads comprise 72 decitex/22 strands which are twisted 150 times are sized with the above solution.

The sizing is effected as is previously described in Example 11.

The sized yarn is woven on a shuttle-loom at 210 strokes/min. into a tissue having a width of 1.60 m and a linen weave.

The woof-yarn is a polyester-cotton yarn which contains 67% of polyester and 33% of cotton. Weaving results are excellent.

EXAMPLE 15

A sizing solution containing 4.2% of the polyurethane of Example 5 and 1.4% polyvinylic alcohol (Gerol, 30/70) is prepared.

A chain of non-textured polyester yarn wherein the threads comprise 50 decitex/16 strands which are twisted only 20 times, are sized with the above solution.

The sizing is done on a 7-drum machine, wherein the first two drums are heated to 140° C. and the remaining five drums to 135° C. The sizing speed is 220 m/min. The sized yarn is used for weaving on a 240 stroke/min. projectile loom into a tissue having a width of 1.60 m and a taffeta weave woven with a polyester yarn, 72 decitex/22 strands, twisted 20 times at 30 strokes/min.

Weaving results are excellent. 3% of the polymer had been deposited on the yarn of the chain and no deposits were noted on the loom parts. Weaving yield is 95–97%.

The above examples and disclosure are set forth merely for illustrating the mode and the manner of the invention and, while various modifications and embodiments can be made by those skilled in the art, in the light of this invention, they are made without departing from the spirit of the invention. It is intended, therefore, that the invention be limited only by the scope of the claims which follow.

What is claimed is:

1. A film-forming, directly water-soluble, anionic polyester-polyurethane comprising recurring units of the formula —A—B—, wherein A is a sulfonated anionic polyester having a sulfur content of between about 0.8 and 2% by weight, an acid number of less than about 200 mg KOH/g, and a molecular weight of between about 500 and 3,000, and B is a diurethane unit.

2. The polyester-polyurethane as defined by claim 1, having an average molecular weight of from about 10,000 to about 100,000.

3. A liquid composition for treating textile materials comprising water and dissolved therein a polyester-polyurethane as defined by claim 2, in an amount sufficient to impart abrasion resistance to the treated textile material.

4. A process for treating textile materials which comprises applying thereto a liquid composition as defined by claim 3, in an amount sufficient to impart abrasion resistance to said textile material.

5. The polyester-polyurethane as defined by claim 1, wherein the diisocyanate is selected from a group consisting of aliphatic, cycloaliphatic, unsaturated cycloaliphatic, aryl and alkylaryl diisocyanates.

6. The polyester-polyurethane as defined by claim 5, wherein the diisocyanate is selected from the group consisting of toluene diisocyanate, diphenylmethane diisocyanate and hexamethylene diisocyanate.

7. The polyester-polyurethane as defined by claim 1, wherein the sulfonated anionic polyester has an acid number of less than about 5 mg KOH/g.

8. The polyester-polyurethane as defined by claim 1, wherein the sulfonated anionic polyester has a sulfur content of between about 1.2 and 1.8% by weight.

9. A shaped article comprising the polyester-polyurethane as defined by claim 1, in powder, granule or flake form.

10. A method for the preparation of the polyester-polyurethane as defined by claim 1, comprising reacting at least one diisocyanate with a sulfonated anionic polyester having a sulfur content of between about 0.8 and 2% by weight, an acid number of less than about 20 mg KOH/g, and a molecular weight of between about 500 and 3,000, the molar ratio of isocyanate groups to total hydroxyl and carboxyl groups in said reactants being less than about 1.

11. The method as defined by claim 10, wherein the diisocyanate is selected from a group consisting of aliphatic, cycloaliphatic, unsaturated cycloaliphatic, aryl and alkylaryl diisocyanates.

12. The method as defined by claim 11, wherein the diisocyanate is selected from the group consisting of toluene diisocyanate, diphenylmethane diisocyanate and hexamethylene diisocyanate.

13. The method as defined by claim 10, wherein the sulfonated anionic polyester has an acid number of less than about 5 mg KOH/g.

14. The method as defined by claim 10, wherein the sulfonated anionic polyester has a sulfur content of between about 1.3 and 1.8% by weight.

15. The method as defined by claim 10, wherein the resultant polyester-polyurethane has an Mn value of between about 10,000 and 100,000.

16. The method as defined by claim 10, wherein the reaction is conducted in molten medium.

17. The polyester-polyurethane as defined by claim 1, which is a polycondensation product resulting from the reaction of at least one diisocyanate with a sulfonated anionic polyester having a sulfur content of between about 0.8 and 2% by weight, an acid number of less than about 20 mg KOH/g, and a molecular weight of between about 500 and 3,000, the molar ratio of isocyanate groups to total hydroxyl and carboxyl groups in said reactants being less than about 1.

18. A liquid composition for treating textile materials comprising water and dissolved therein a polyester-polyurethane as defined by claim 17, in an amount sufficient to impart abrasion resistance to the treated textile material.

19. A process for treating textile materials which comprises applying thereto a liquid composition as defined by claim 18, in an amount sufficient to impart abrasion resistance to said textile material.

20. A liquid composition for treating textile materials comprising water and dissolved therein a polyester-polyurethane as defined by claim 1, in an amount sufficient to impart abrasion resistance to the treated textile material.

21. A shaped article comprising a textile fiber bearing a water-washable sizing of the aqueous solution as defined by claim 20.

22. A shaped article comprising a flesh and grain split leather substrate, said flesh and grain splits having been bonded with the aqueous solution as defined by claim 20.

23. A liquid composition as defined by claim 20, wherein the amount of polyester-polyurethane is from about 1% to about 40%.

24. A process for treating textile materials which comprises applying thereto a liquid composition as defined by claim 23, in an amount sufficient to impart abrasion resistance to said textile material.

25. A process for treating textile materials which comprises applying thereto a liquid composition as defined by claim 20, in an amount sufficient to impart abrasion resistance to said textile material.

26. The process as defined by claim 25, which comprises applying the liquid composition to textile yarns in an amount sufficient to impart thereto an abrasion resistance sufficient to render the yarn weavable.

27. The process as defined by claim 26, wherein the textile yarn is a polyester yarn or a texturized polyester yarn.

28. The process as defined by claim 25, wherein the amount of the liquid composition applied to the textile material is equivalent to 1 to 3% by weight of the polyester-polyurethane relative to the dry weight of the textile material.

29. The process as defined by claim 25, wherein the textile material is a manmade textile material.

30. The process as defined by claim 25, wherein the textile material is a polyester material or a texturized polyester material.

31. An article of manufacture which comprises a textile material having deposited thereon an amount of a polyester-polyurethane as defined by claim 1, which is sufficient to impart abrasion resistance to said material.

32. The article of manufacture as defined by claim 31, which is a textile yarn.

33. The article of manufacture as defined by claim 32, which is a polyester yarn or a texturized polyester yarn.

34. The article of manufacture as defined by claim 31, wherein the amount of the polyester-polyurethane is from about 1 to about 3% by weight of the dry material.

35. A film-forming, directly water-soluble, anionic polyester-polyurethane comprising recurring units of the formula —A—B—, wherein A is a sulfonated anionic polyester having a sulfur content of between about 0.8 and 2% by weight, an acid number of less than about 200 mg KOH/g, and a molecular weight of between about 500 and 3,000, and B is a diurethane unit, wherein the sulfonated anionic polyester is the co-condensation product of an organic diacid, an organic sulfonated diacid and a diol, or the ester-forming derivatives thereof.

36. The polyester-polyurethane as defined by claim 35, wherein the organic diacid is selected from the group consisting of saturated or unsaturated aliphatic diacids, aromatic diacids, polynuclear aromatic diacids, araliphatic diacids, and the ester-forming derivatives thereof.

37. The polyester-polyurethane as defined by claim 36, wherein the organic diacid is selected from the group consisting of succinic, adipic, suberic, sebaric, maleic, fumaric, itaconic, orthophthalic, isophthalic and terephthalic acid.

38. The polyester-polyurethane as defined by claim 37, wherein the organic diacid is selected from the group consisting of adipic, orthophthalic, isophthalic and terephthalic acid.

39. The polyester-polyurethane as defined by claim 35, wherein the diol is selected from the group consisting of aliphatic and cycloaliphatic glycols.

40. The polyester-polyurethane as defined by claim 39, wherein the diol is selected from the group consisting of ethylene glycol, diethylene glycol and neopentyl glycol.

41. The polyester-polyurethane as defined by claim 35, wherein the organic sulfonated diacid is selected from the group consisting of sulfoisophthalic and sulfosuccinic acid, and the ester-forming derivatives thereof.

42. The polyester-polyurethane as defined by claim 41, wherein the organic sulfonated compound is selected from the group consisting of 5-sulfo-isophthalic acid, sodium dimethylisophthalate-5-sulfonate and sodium dimethylsulfosuccinate.

43. A film-forming, directly water-soluble, anionic polyester-polyurethane comprising recurring units of the formula —A—B—, wherein A is a sulfonated anionic polyester having a sulfur content of between about 0.8 and 2% by weight, an acid number of less than 200 mg KOH/g, and a molecular weight of between about 500 and 3,000, and B is a diurethane unit, wherein the polyester chain A comprises at least one unit of the formula I and at least one unit of the formula II $$\mathrm{+O-\overset{O}{\overset{\|}{C}}-R_1-\overset{O}{\overset{\|}{C}}-O-R_2\!+} \quad (I)$$

$$\mathrm{+O-\overset{O}{\overset{\|}{C}}-R_3-\overset{O}{\overset{\|}{C}}-O-R_2\!+} \quad (II)$$

wherein
$R_1$ is a divalent saturated hydrocarbon group, a divalent unsaturated aliphatic hydrocarbon group or a divalent monocyclic aromatic group,
$R_2$ is a divalent saturated aliphatic group or a divalent saturated cyclic hydrocarbon group, and
$R_3$ is a $$\mathrm{-CH-CH_2-} \quad \text{or a} \quad \begin{array}{c}\\ \text{\textlangle}\bigcirc\text{\textrangle}-SO_3M \\ |\\ SO_3M \end{array}$$

group wherein M is an alkali metal ion.

44. The polyester-polyurethane as defined by claim 43, wherein the polyester units A are linked together by diurethane unit B having the formula $$\mathrm{+O-\overset{O}{\overset{\|}{C}}-NH-R_4-NH-\overset{O}{\overset{\|}{C}}-O-R_2\!+}$$

wherein
$R_2$ is as defined above, and
$R_4$ is a divalent group selected from the group consisting of hexamethylene, tetramethylene $$\mathrm{-CH_2\diagup\!\!\bigcirc\!\!\diagdown\overset{CH_3,}{\phantom{X}}}_{CH_3}$$

m-phenylene, p-phenylene, 2,4-tolylene, 2,6-tolylene, 4,4′-diyl-dicyclohexylmethane, 4,4′-diphenylmethane, 1,5-diyl-naphthalene.

45. A liquid composition for treating textile materials comprising water and dissolved therein a polyester-polyurethane as defined by claim 44, in an amount sufficient to impart abrasion resistance to the treated textile material.

46. The polyester-polyurethane as defined by claim 43, wherein $R_1$ is a divalent group selected from the group consisting of ethylene, tetramethylene, hexamethylene, octamethylene, vinylene, 2,3-propenylene, o-phenylene, m-phenylene, and p-phenylene, and $R_2$ is a divalent group selected from the group consisting of ethylene, tetramethylene, hexamethylene, 2,2-dimethylpropylene, 3,-oxopentamylene, 4-oxoheptanylene, 1,3-cyclohexylene and 4,4′-diyl-2,2-dicyclohexylpropane.

47. A liquid composition for treating textile materials comprising water and dissolved therein a polyester-polyurethane as defined by claim 43, in an amount sufficient to impart abrasion resistance to the treated textile material.

48. A method for the preparation of a film-forming, directly water-soluble, anionic polyester-polyurethane comprising reacting at least one diisocyanate with a sulfonated anionic polyester having a sulfur content of between about 0.8 and 2% by weight, an acid number of less than about 20 mg KOH/g, and a molecular weight of between about 500 and 3,000, the molar ratio of isocyanate groups to total hydroxyl acid carboxyl groups in said reactants being less than about, 1 wherein the sulfonated anionic polyester is the co-condensation product of an organic diacid, an organic sulfonated diacid and a diol, or the ester-forming derivatives thereof.

49. The method as defined by claim 48, wherein the organic diacid is selected from the group consisting of saturated or unsaturated aliphatic diacids, aromatic diacids, polynuclear aromatic diacids, araliphatic diacids, and the ester-forming derivatives thereof.

50. The method as defined by claim 49, wherein the organic diacid is selected from the group consisting of succinic, adipic, suberic, sebaric, maleic, fumaric, itaconic, orthophthalic isophthalic and terephthalic acid.

51. The method as defined by claim 50, wherein the organic diacid is selected from the group consisting of adipic, orthophthalic, isophthalic and terephthalic acid.

52. The method as defined by claim 48, wherein the diol is selected from the group consisting of aliphatic and cycloaliphatic glycols.

53. The method as defined by claim 52, wherein the diol is selected from the group consisting of ethylene glycol, diethylene glycol and neopentyl glycol.

54. The method as defined by claim 48, wherein the organic sulfonated diacid is selected from the group consisting of sulfoisophthalic and sulfosuccinic acid, and the ester-forming derivatives thereof.

55. The method as defined by claim 54, wherein the organic sulfonated compound is selected from the group consisting of 5-sulfo-isophthalic acid, sodium dimethylisophthalate-5-sulfonate and sodium dimethylsulfosuccinate.

* * * * *

UNITED STATES PATENT AND TRADEMARK OFFICE
CERTIFICATE OF CORRECTION

PATENT NO. : 4,150,946

DATED : April 24, 1979

INVENTOR(S) : Jean Neel; Robert Violland

It is certified that error appears in the above-identified patent and that said Letters Patent are hereby corrected as shown below:

Column 2, line 57, change "200" to --20--;

Claim 1, Column 10, line 34, change "200" to --20--;

Claim 14, Column 11, line 19, change "1.3" to --1.2--;

Claim 35, Column 12, line 32, change "200" to --20--;

Claim 43, Column 13, line 5, change "200" to --20--;

Signed and Sealed this

First Day of April 1980

[SEAL]

*Attest:*

SIDNEY A. DIAMOND

*Attesting Officer*   *Commissioner of Patents and Trademarks*